(No Model.)
A. H. WATSON & F. E. ANTONINI.
ELECTRICALLY HEATED CURLING IRON.
No. 475,169. Patented May 17, 1892.
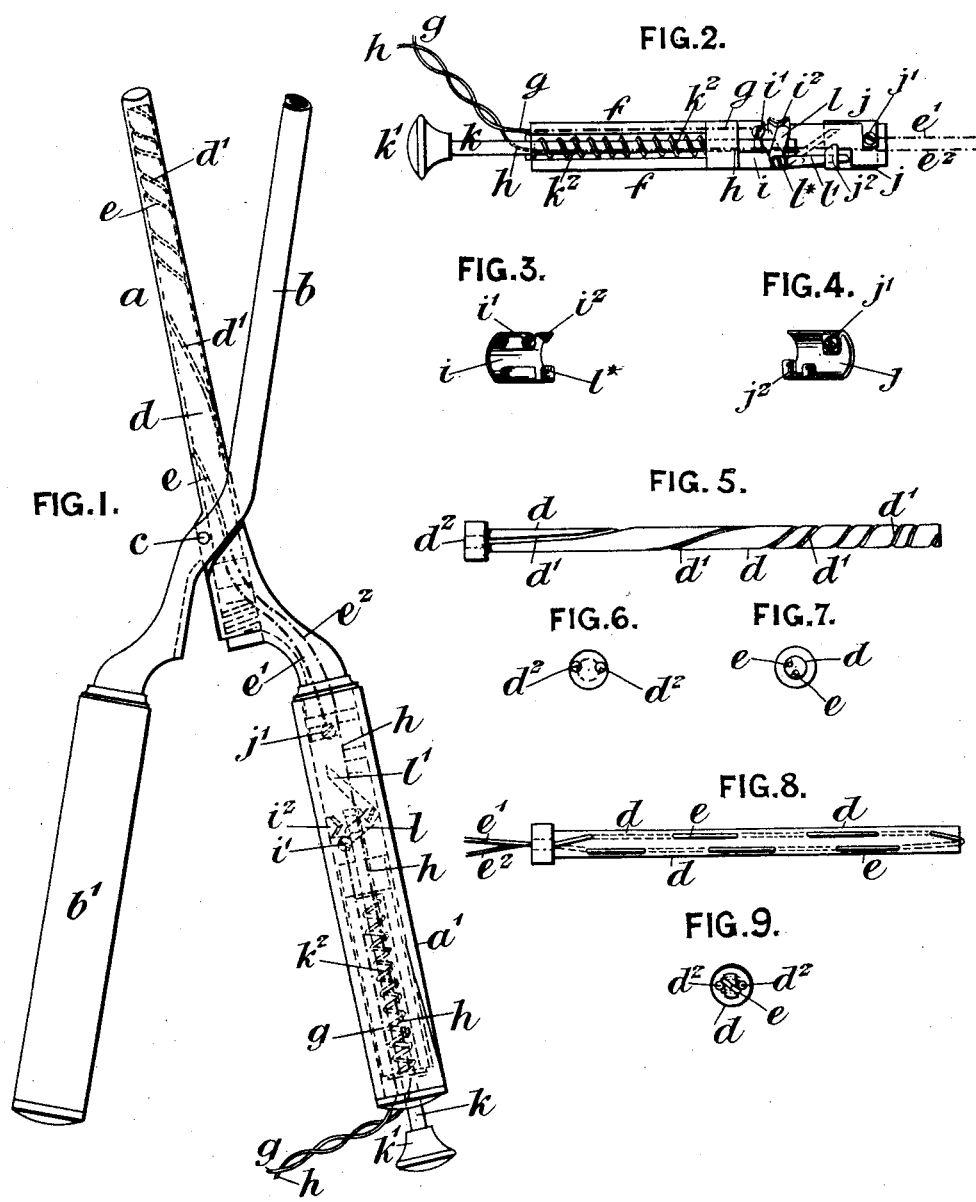
Witnesses:
George E. Cross
M. E. Knight
Inventors:
Arthur H. Watson
Frank E. Antonini
By Knight Bros.
Attorneys.

UNITED STATES PATENT OFFICE.

ARTHUR HENRY WATSON AND FRANK EMANUEL ANTONINI, OF LONDON, ENGLAND.

ELECTRICALLY-HEATED CURLING-IRON.

SPECIFICATION forming part of Letters Patent No. 475,169, dated May 17, 1892.

Application filed December 1, 1891. Serial No. 413,726. (No model.)

*To all whom it may concern:*

Be it known that we, ARTHUR HENRY WATSON, residing at 4 Pall Mall, and FRANK EMANUEL ANTONINI, residing at 12 Park Lane, Hyde Park, in the county of Middlesex, England, subjects of the Queen of Great Britain, have invented new and useful Improvements in Tongs or Irons for Curling or Goffering, of which the following is a specification.

The invention relates to heating tongs or irons for curling or goffering by the application of a current of electricity to one or both jaws of the tongs or irons. Hitherto it has been customary to heat such tongs or irons by placing them in a flame or fire of some kind until the requisite temperature is attained, and the curling or goffering process had to be completed before the irons or tongs had cooled, or the latter had to be reheated from time to time, as might be required. According to our invention the curling or goffering tongs or irons can be heated as required and the temperature maintained at will by means of an electric current passing within the tongs or irons and controlled by the operator. The means by which this is effected are as follows: One or both of the jaws of the tongs or irons is or are made tubular in such manner as to allow the heating material—such as platinum wire or other suitable substance—to be placed inside in a suitable manner, so that when a current of electricity is allowed to pass through such heating material the latter becomes intensely hot and imparts its heat to the surrounding metal. The current of electricity is controlled—that is to say, allowed to pass through or stopped at will—by means of a suitable switch or contact-maker fitted in the handle or other part of said tongs or irons.

Our invention is illustrated in the accompanying drawings, in which—

Figure 1 is an exterior view of a pair of tongs or irons for curling or goffering having one cylindrical jaw and one trough-shaped jaw. Fig. 2 is a view of the switch and parts connected therewith removed from the hollow handle of the tubular jaw. Figs. 3 and 4 are perspective views of the fixed contact-pieces of the switch. Fig. 5 is a side view, and Figs. 6 and 7 are end views, of the insulating-carrier for the heating-wire; and Fig. 8 is a side view, and Fig. 9 is an end view, of a modified form of insulated carrier for the heating-wire.

$a$ is the cylindrical jaw, and $a'$ is its handle.

$b$ is the trough-shaped jaw, and $b'$ is its handle. The two jaws are pin-jointed together at $c$. The jaw $a$ is made tubular in order to allow an electrical conductor to be placed inside it. This is conveniently accomplished in the following manner: An insulator $d$ is constructed of porcelain, earthenware, or other non-conducting material and of such form and dimensions as to pass inside the tube $a$ of the tongs or irons and to carry with it the electric conductor $e$, for which purpose we construct the insulator $d$ of cylindrical form, as shown at Fig. 5, and with spiral grooves $d'$ of such proportions as will allow the conductor $e$ to lie within them and to be near to but not touch the walls of the tube $a$, as shown at Fig. 7, or we preferably form the insulator $d$, as shown at Figs. 8 and 9, of a flattened cross-section and form holes therein at intervals, so as to allow the heating-conductor to be threaded to and fro through such holes, as shown. In either form of insulator the heating-conductor $e$ passes through one of the holes $d^2$ in the head of the insulator, then to and fro through holes along the length of the insulator, then over the small end thereof, and returns by passing to and fro through holes to the head of the insulator, where it passes out through the second hole $d^2$. We place within the handle $a'$ an insulator $f$, of porcelain or other suitable material, formed with channels to receive the conducting-wires $g$ $h$ and fitted with the metallic conductors $i$ $j$. The end of the conducting-wire $g$ is attached to the terminal $i'$ and the end $e'$ of the heating-conductor $e$ is attached to the terminal $j'$, the end $e^2$ of the heating-conductor $e$ being connected with the conducting-wire $h$.

The conductor $i$ is formed with a spring-contact $i^2$ and the conductor $j$ with a fixed contact-piece $j^2$, and for the purpose of permitting the current of electricity to pass to the heating arrangement above described and to be cut off therefrom with facility we construct a switch or contact maker and breaker within the handle $a'$ as follows: A press-button $k'$ at the end of the handle $a'$ or at other suitable position is attached to the outer end of the rod $k$, the inner end of which acts upon the short arm $l$ of a bell-crank-lever contact-pin jointed at $l^3$ to the conductor $i$. The end of this short arm $l$ is constantly in contact with the spring contact-piece $i^2$ and the long arm $l'$ is capable of being placed in contact with the fixed contact-piece $j^2$ and of being removed therefrom. A spring $k^2$ acts on the rod $k$ to keep it pressed normally outward, in which position the long arm $l'$ of the bell-crank lever would be held free of the contact-piece $j^2$; but when the press-button $k'$ and rod $k$ are pressed inward to the position shown in Fig. 2 the long arm $l'$ of the bell-crank lever is pressed against the fixed contact-piece $j^2$, thereby completing the circuit from the conducting-wire $g$ through the heating-conductor $e$ to the conducting-wire $h$. The end of the spring contact-piece $i^2$ is made of V-form, in order to hold the bell-crank lever $l\,l'$ firmly in position either at contact or vice versa, and the form of this spring contact-piece $i^2$ is such as to accelerate the movement of the bell-crank lever $l\,l'$ after it has been started by the press-button $k'$ and rod $k$. The conductors $i\,j$ are shaped to fit and slide onto the insulator $f$ in such relative positions as to enable the bell-crank lever $l\,l'$ to bridge from one to the other, and such conductors are fixed in position by the terminal screws $i'\,j'$. It will be evident that both jaws and handles of the tongs or irons may be formed and fitted with electric conductors, insulators, heaters, and switch, as above described with respect to the jaw $a$, and handle $a'$ and that the tongs or irons may be used for curling, goffering, crimping, or other like purpose, and we would here remark that we do not confine ourselves to the peculiar construction of heater, insulators, conductors, and switch herein shown and described, as they are given only as an example of one method of putting our invention into effect.

Having fully described our invention, what we desire to claim and secure by Letters Patent is—

1. The combination, with tongs or irons for curling, goffering, &c., of an electrical heater, conductors, insulators, a switch placed inside the curling or goffering jaws and handles for the purpose of imparting heat to them while in use, and a push-rod arranged longitudinally of one of the handles for actuating said switch, substantially as herein shown and described.

2. The combination, with tongs or irons for curling, goffering, &c., heated by electricity, of a switch arrangement in the handle of heating-jaw and a movable rod arranged within and longitudinally of said handle for actuating said switch, substantially as herein shown and described, for the purpose of controlling the supply of electricity.

3. The combination, with tongs or irons for curling, goffering, &c., of insulator placed inside the curling or goffering jaw and the electrical heater intertwined around or threaded through said insulator, whereby it is carried and supported by the insulator, substantially as herein shown and described.

ARTHUR HENRY WATSON.
FRANK EMANUEL ANTONINI.

Witnesses:
THOS. WILLIAM WATSON,
   4 *Pall Mall, London.*
CLAUDE K. MILLS,
*Patent Agent*, 23 *Southampton Buildings, London.*